US012798925B2

(12) United States Patent
Studer et al.

(10) Patent No.: US 12,798,925 B2
(45) Date of Patent: Nov. 17, 2026

(54) DOOR DRIVE DEVICE WITH TWO INDEPENDENTLY DISPLACEABLE DRIVERS

(71) Applicant: INVENTIO AG, Hergiswil (CH)

(72) Inventors: Christian Studer, Kriens (CH); Axel Hosemann, Auw (CH); Bjarne Lindberg, Hellbuhl (CH)

( * ) Notice: Subject to any disclaimer, the term of this patent is extended or adjusted under 35 U.S.C. 154(b) by 44 days.

(21) Appl. No.: 19/100,110

(22) PCT Filed: Sep. 5, 2023

(86) PCT No.: PCT/EP2023/074216
§ 371 (c)(1),
(2) Date: Jan. 30, 2025

(87) PCT Pub. No.: WO2024/056435
PCT Pub. Date: Mar. 21, 2024

(65) Prior Publication Data

US 2026/0035213 A1 Feb. 5, 2026

(30) Foreign Application Priority Data

Sep. 12, 2022 (EP) .................................... 22195140

(51) Int. Cl.
*B66B 13/12* (2006.01)

(52) U.S. Cl.
CPC .................................. *B66B 13/125* (2013.01)

(58) Field of Classification Search
None
See application file for complete search history.

(56) References Cited

U.S. PATENT DOCUMENTS 2,235,381 A * 3/1941 Mccormick ............. B66B 13/12
187/319
6,446,759 B1 9/2002 Kulak et al.

FOREIGN PATENT DOCUMENTS

EP 0332841 B1 4/1992
EP 1541518 B1 3/2012
JP 2003026381 A * 1/2003
JP 2005170681 A * 6/2005 ............. B66B 13/12
WO WO-2006120721 A1 * 11/2006 ........... B66B 13/146
WO WO-2007046149 A1 * 4/2007 ............. B66B 13/14
WO WO-2013190578 A1 * 12/2013 ........... B66B 13/125

* cited by examiner

*Primary Examiner* — Diem M Tran
(74) *Attorney, Agent, or Firm* — Schlee IP International, PC; Alexander R. Schlee; Pascal A. Schlee

(57) ABSTRACT

The invention relates to a door drive device for opening and closing corresponding elevator door leaves of elevator doors. The door drive device may have a first driver acting upon a first coupling element arranged on a first elevator door leaf to open a first elevator door leaf of a first elevator door, and a second driver acting upon a second coupling element arranged on a first elevator door leaf to close the first elevator door leaf. The first and second drivers can be displaced by a drive unit in an opening direction and a closing direction of the first elevator door. The drive unit may have a first drive for displacing the first driver and a second drive for displacing the second driver, and the first and second drivers can be displaced independently of one another in the opening direction and in the closing direction by the drive unit.

8 Claims, 2 Drawing Sheets

DOOR DRIVE DEVICE WITH TWO INDEPENDENTLY DISPLACEABLE DRIVERS

CROSS-REFERENCE TO RELATED APPLICATIONS

This application is a national phase entry under 35 USC 371 of the international patent application PCT/EP2023/074216 filed on Sep. 5, 2023 and published under the publication number WO 2024/056435 A1, claiming the priority right from the European patent application EP 22195140.3 filed on Sep. 12, 2022.

FIELD OF THE INVENTION

The invention relates to a door drive device for opening and closing corresponding elevator door leaves of elevator doors of an elevator.

BACKGROUND OF THE INVENTION

EP 0 332 841 B1 describes a door drive device for opening and closing corresponding elevator door leaves of elevator doors of an elevator. One elevator door leaf is designed as a cabin door leaf of a cabin door, and the other elevator door leaf is designed as a shaft door leaf of a shaft door. The door drive device has a first driver which acts upon a first coupling element, arranged on the shaft door leaf, to open a shaft door leaf and a second driver which acts upon a second coupling element, arranged on the shaft door leaf, to close the shaft door leaf. The first driver and the second driver can be displaced by means of a drive unit in an opening direction and a closing direction of the elevator door. The two drivers in the form of driver runners are part of a coupling mechanism, and their distance from each other can be adjusted by a parallelogram guide with two adjustment elements that can each be pivoted about a pivot axis. The two driver runners can thus assume a non-spread position and a spread position. In the non-spread position, the two driver runners can be guided between two coupling elements of a shaft door leaf so that the elevator cabin can travel past a floor and thus past a shaft door. When an elevator cabin is correctly positioned at a floor level, the two driver runners are located between the two coupling elements arranged next to each other on the shaft door leaf and can be moved (spread) laterally towards them in order to unlock the shaft door leaf on the one hand, and to transmit the opening and closing movement of the cabin door leaf to the shaft door leaf synchronously and without play on the other. The two driver runners are thus moved from their non-spread position to their spread position. The distance adjustment between the two driver runners is carried out by a door drive unit, attached to a cabin door frame, via a linear drive means (e.g., by a belt drive) which also causes the opening and closing movements of the cabin door leaf.

In order for the described travel past a shaft door on the one hand and the coupling with a shaft door leaf and the subsequent opening of the shaft door on the other to work smoothly, the coupling elements on the shaft door leaves of the various floors must be aligned very precisely and, in particular, symmetrically with respect to the driver runners. In particular, the distance from all coupling elements in the opening or closing direction to the driver runners in their non-spread position must be within a precisely specified range of, for example, +/−mm. This manual alignment, which must be carried out by a technician during installation or maintenance of an elevator, can be very time-consuming, especially in buildings with many floors.

In contrast, it is in particular the object of the invention to propose a door drive device which does not require time-consuming adjustment work and thus enables a quick and cost-effective installation and maintenance of an elevator system with the door drive device according to the invention. According to the invention, this object is achieved by a door drive device according to the invention.

SUMMARY OF THE INVENTION

The door drive device according to the invention for opening and closing corresponding elevator door leaves of elevator doors of an elevator in the form of a cabin door leaf of a cabin door and a corresponding shaft door leaf of a shaft door has a first driver which acts upon a first coupling element arranged on the first elevator door leaf to open a first elevator door leaf of a first elevator door, and a second driver which acts upon a second coupling element arranged on the first elevator door leaf to close the first elevator door leaf of the first elevator door. The first driver and the second driver can be displaced by means of a drive unit in an opening direction and a closing direction of the first elevator door. According to the invention, the drive unit has a first drive for displacing the first driver and a second drive for displacing the second driver, and the first driver and the second driver can be displaced independently of one another in the opening direction and in the closing direction by means of the drive unit.

DETAILED DESCRIPTION OF THE INVENTION

The property of being able to displace the two drivers independently of one another makes it possible, in particular, for the door drive device to reliably open the first elevator door leaf even if, when the elevator doors are closed, the distance between the first coupling element and the first driver differs significantly from the distance between the second coupling element and the second driver. This means that such precise and time-consuming adjustments to the coupling elements are not necessary. For example, it is sufficient that an actual position of the first elevator door leaf in its closed position deviate from a theoretical position by up to 2 to 4 cm in the opening direction or in the closing direction. Generally speaking, the door drive device with the two independently displaceable drivers can be used more flexibly and robustly than a door drive device with coupled drivers. A further advantage of the door drive device according to the invention is that not all shaft doors on the floors served by the elevator have to be designed the same. The independent displacement of the two drivers allows shaft doors of different designs to be opened and closed.

The elevator doors can have door leaves that only open in one direction, so-called side-opening single-leaf doors, or door leaves that open outwards from the middle. In the case of elevator doors that open from the middle, two door drive devices are provided. In the following, elevator doors with door leaves that only open in one direction, i.e., in the opening direction, are assumed. The door drive devices described can be transferred to elevator doors that open from the middle with minor adaptations that are obvious to a person skilled in the art.

Corresponding elevator door leaves or corresponding elevator doors are understood here to mean elevator door leaves or elevator doors that are opened and closed together when the elevator cabin stops at a floor. The corresponding elevator door leaves and the corresponding elevator doors are arranged one behind the other in a horizontal direction when the elevator cabin stops at a floor.

The first and the second drivers have in particular an elongated, narrow basic shape and are designed, for example, as elongated rods. In particular, they are aligned parallel to the direction of displacement of the elevator cabin and thus perpendicular to the opening and closing direction of the elevator doors, which is in particular horizontal. The elongated shape enables the already known function of starting to open the elevator doors before the elevator cabin has reached its final position at a floor.

The first and second coupling elements, as well as optionally present further coupling elements, are designed in particular as rollers. The rollers are arranged so that they can rotate freely around an axis of rotation oriented perpendicular to the corresponding cabin door leaf. This means that, when the elevator door is opened early as described, the driver can roll on the coupling element, which is designed as a roller, without much resistance.

The action of a driver of the door drive device upon a coupling element arranged on an elevator door leaf is to be understood here as meaning that the driver exerts a force on the corresponding coupling element and displaces the coupling element in the opening direction or closing direction. In addition, the coupling element can also execute a movement in a direction deviating from the opening and closing direction, which serves, for example, to unlock a lock on an elevator door.

As described above, the first driver and the second driver can be displaced independently of one another in the opening direction and in the closing direction, i.e., in particular, horizontally. This means that the two drivers are not mechanically coupled to one another, which enables the independent displacement described. The first driver and the second driver can thus each be displaced individually in the opening direction and in the closing direction. In particular, the two drivers are displaced along a common line. This does result in certain restrictions regarding the displacement of the two drivers relative to each other, but this has no influence on the aforementioned independent displacement. In this case, the two drivers can be displaced towards each other until they touch each other.

In one embodiment of the invention, the first coupling element arranged on the first elevator door leaf of the first elevator door can be displaced in a first unlocking direction deviating from the opening direction and the closing direction when displaced in the opening direction. The first coupling element is mechanically coupled to a first lock of the first elevator door such that the first lock is unlocked via said displacement of the first coupling element in the first unlocking direction. This allows the first elevator door to be unlocked, advantageously, by the interaction of the first driver and the first coupling element, and no separate actuator is required for unlocking the first elevator door.

In its locked position, said first lock fixes the first elevator door leaf on which the first driver is arranged—for example, relative to a frame of the corresponding first elevator door. When the first lock is unlocked, i.e., has been brought into its unlocked position, the elevator door leaf can be displaced relative to the aforementioned frame, and the elevator door can thus be opened.

The first coupling element can in particular be displaced in the first unlocking direction only when the first elevator door is completely closed, and the first coupling element is thus in a corresponding closed position.

The first coupling element can, for example, be arranged on a lever which is rotatable about a rotation axis running perpendicular to the opening direction and perpendicular to the first unlocking direction. The lever is designed in such a way that, without interacting with the first driver, due to its weight distribution, it assumes a position in which the first lock, which is coupled to the lever via a rod, is locked. When the first driver acts upon the first coupling element in the opening direction, the first coupling element is displaced not only in the opening direction, but also in the first unlocking direction running perpendicular thereto. This leads to a rotation of said lever about the axis of rotation and a transmission of the displacement of the first coupling element via said rod to the first lock, which is thus unlocked.

It is also possible for the first lock of the elevator shaft door to be operated independently of the coupling elements, e.g., with an actuator or an electromagnet, and thus locked and unlocked.

In one embodiment of the invention, the first driver acts upon a third coupling element, arranged on the second elevator door, to open a second elevator door leaf, corresponding to the first elevator door leaf, of a second elevator door, and the second driver acts upon a fourth coupling element, arranged on the second elevator door, to close the second elevator door leaf of the second elevator door. In other words, not only the first elevator door but also the second elevator door is opened and closed by means of the two drivers. This means that no separate drive is required for displacing the second elevator door leaf of the second elevator door.

The third and fourth coupling elements are designed in particular in the same way as the first and second coupling elements. The drive unit has in particular a first drive for displacing the first driver and a second drive for displacing the second driver. The third and fourth coupling elements can be arranged directly on the second elevator door leaf. They can also be arranged on a component, which is permanently connected to the second elevator door leaf, of the second elevator door. Such a component can, for example, be a so-called suspension carriage from which the second elevator door leaf is suspended.

In one embodiment of the invention, a second elevator door leaf, corresponding to the first elevator door leaf, of a second elevator door is permanently coupled to the drive unit and can thus be displaced directly by the drive unit in the opening direction and in the closing direction. This means that no coupling elements are necessary on the second elevator door leaf of the second elevator door.

A permanent coupling of the second elevator door leaf with the drive unit is to be understood here as meaning that there is a drive connection that cannot be interrupted during normal operation of the elevator, e.g., via a connection with a rotor of a linear motor of the drive unit or by means of a chain or a belt between the drive unit and the second elevator door leaf. The drive connection is therefore not established via a driver and a coupling element.

The drive unit has, in particular, a first drive for displacing the first driver, a second drive for displacing the second driver, and a third drive for displacing the second door leaf of the second elevator door. This enables particularly flexible displacement of the two drivers and the second elevator door leaf.

In one embodiment of the invention, at least two of the drives of the drive unit are designed as linear motors. The linear motors have a common stator and in each case a rotor. The aforementioned rotors are displaceable independently of one another along the common stator. This advantageously means that only one stator is required for the two or three linear motors.

It is also possible for the drive unit to have electric motors with a rotating output shaft. The individual electric motors are in this case each coupled to the drivers and, if applicable, the second elevator door leaf of the second elevator door via a chain or belt.

In one embodiment of the invention, the first driver can be displaced via a contact with the first coupling element or the third coupling element in a second unlocking direction deviating from the opening direction and the closing direction. The first driver is also mechanically coupled to a second lock of the second elevator door such that the second lock is unlocked via said displacement of the first driver in the second unlocking direction. This allows the second elevator door to be unlocked, advantageously, by the interaction of the first driver and the first or third coupling element, and no separate actuator is required for unlocking the first elevator door.

As with the first lock mentioned above, the second lock fixes the second elevator door leaf of the second elevator door in its locked position—for example, relative to a frame of the corresponding elevator door. When the second lock is unlocked, i.e., has been brought into its unlocked position, the elevator door leaf can be displaced relative to the aforementioned frame, and the elevator door can thus be opened.

The first driver can in particular then be displaced in the second unlocking direction only when the second elevator door is completely closed, and the first driver is thus in a corresponding closed position.

A displacement of the first driver in the second displacement direction is to be understood here as meaning that at least a part of the first driver is displaced in the second displacement direction. The first driver can, for example, be designed in two parts. For example, an elongated contact element is connected to a base element via two pivoting levers. Due to its own weight, the contact element assumes a position at a maximum distance from the base element without any force being applied. The base element can be displaced by the drive unit in the opening and closing direction. As soon as the contact element rests against the first or third coupling element due to a corresponding displacement of the base element in the opening direction, it is pivoted in the direction of the base element, guided by the aforementioned pivot levers. Among other things, it is displaced perpendicularly to the opening direction and thus in the second unlocking direction. This displacement in the second unlocking direction is transmitted via a rod to the second lock, which is thus unlocked.

It is also possible for the first lock of the elevator shaft door to be operated independently of the coupling elements, e.g., with an actuator or an electromagnet, and thus locked and unlocked.

In one embodiment of the invention, the first elevator door is designed as a shaft door, and the second elevator door is designed as a cabin door. The door drive device is thus arranged on the elevator cabin, in particular on the frame of the cabin door, and is displaced together with the elevator cabin between the floors. This means that only one door drive device is necessary, since it is displaced with the elevator cabin to the various shaft doors, which can then be opened and closed.

However, it is also possible for the first elevator door to be designed as a cabin door and the second elevator door as a shaft door. In this case, the door drive device is arranged on a shaft door, in particular on the frame of a shaft door.

Further advantages, features, and details of the invention can be found in the following description of embodiments and with reference to the drawings, in which like or functionally like elements are provided with identical reference signs. The drawings are merely schematic and are not to scale.

DETAILED DESCRIPTION OF THE DRAWINGS

Figure 1:
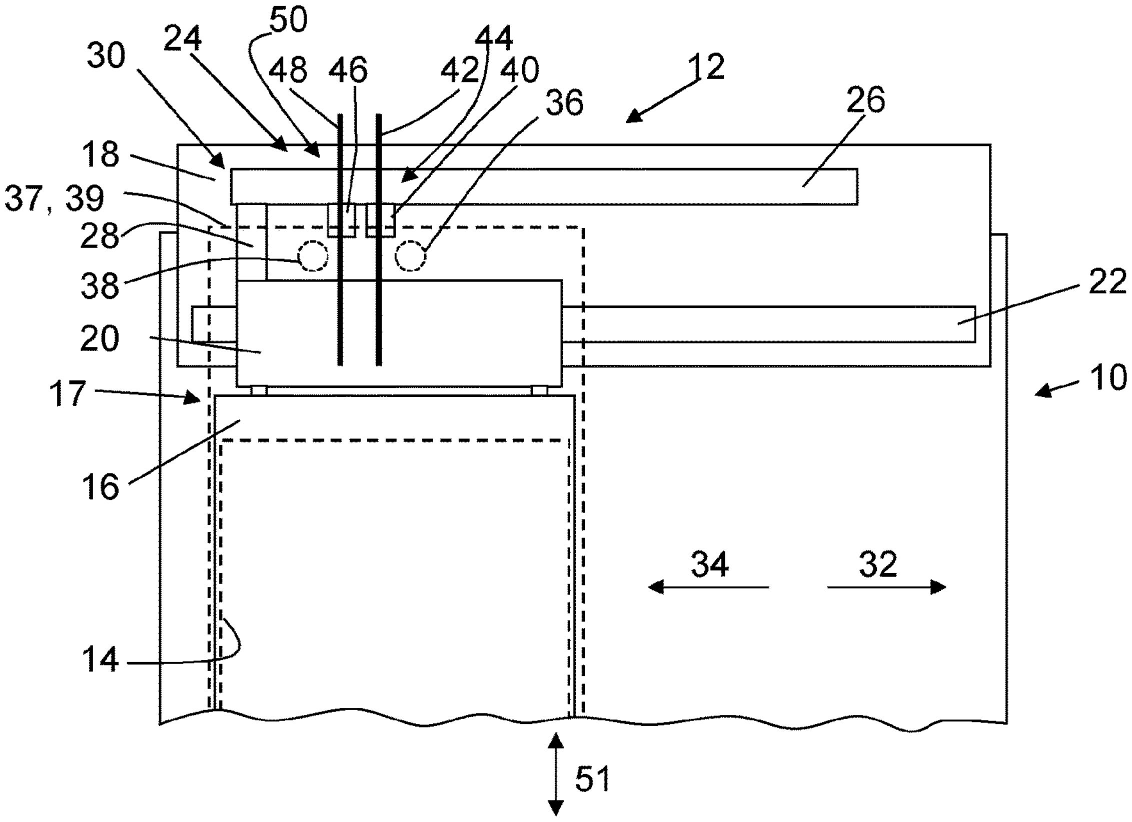
FIG. 1 shows a cabin door of an elevator cabin of an elevator with a door drive device, wherein a cabin door leaf of the cabin door is closed.
Figure 2:
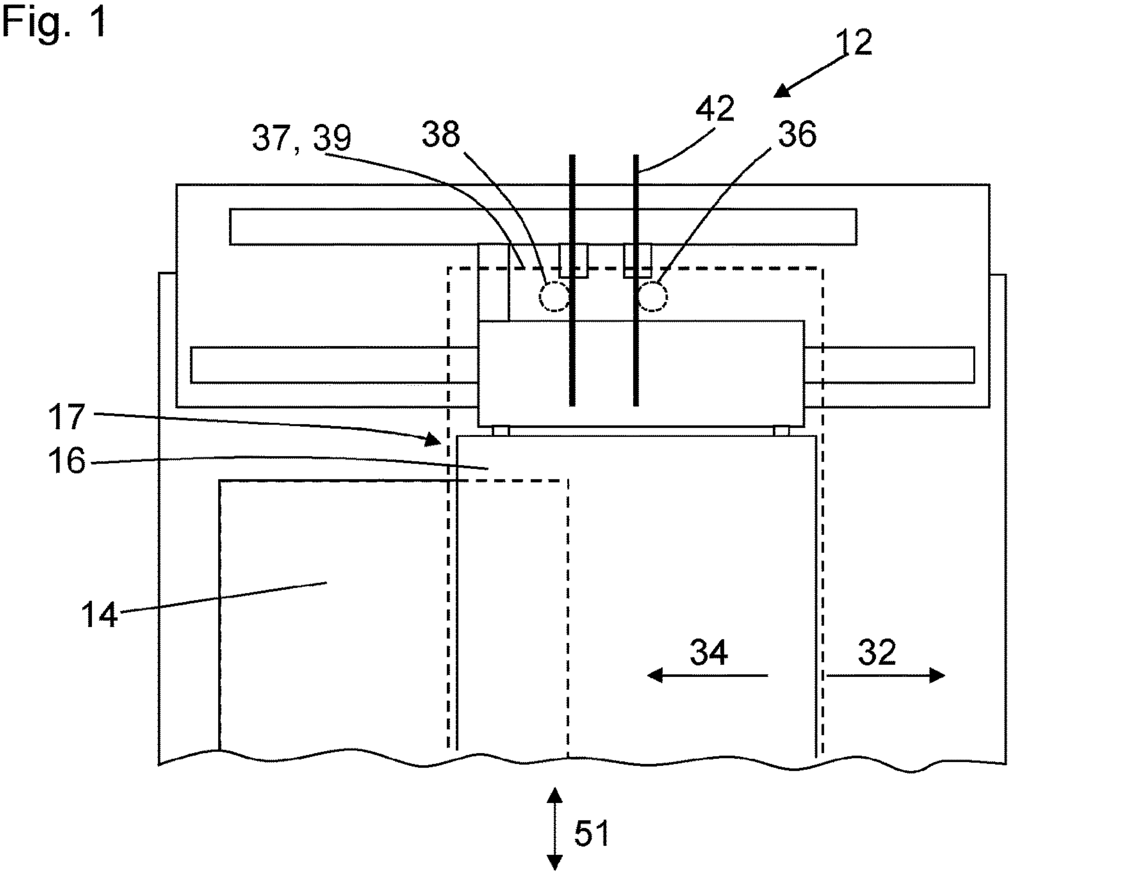
FIG. 2 shows the cabin door from FIG. 1 with a partially opened cabin door leaf.

FIGS. 1 and 2 schematically show a door drive device 12, for a side-opening, single-leaf door, attached to an elevator cabin 10 of an elevator not shown in further detail. The elevator cabin 10 has a door opening 14 which can be closed by a cabin door leaf 16 of a cabin door 17. The door drive device 12 is arranged on a door support 18 attached to the elevator cabin 10. The cabin door leaf 16 is attached to a suspended carriage 20 which is horizontally displaceable along a guide rail 22 fixed to the door support 18 and can be displaced by a drive unit 24 between a door leaf closed position and a door leaf open position.

The drive unit 24 has an elongated stator 26 running parallel to the guide rail 22. The stator 26 forms, together with a first rotor 28, a first linear motor 30. The first rotor 28 can be displaced along the stator 26 by corresponding control of a control unit (not shown). The first runner 28 is fixedly and thus permanently connected to the suspended carriage 20 and thus coupled to the suspended carriage 20, so that the suspended carriage 20 and thus the cabin door leaf 16 can be displaced directly by the first linear motor 30 and thus by the drive unit 24 to open in an opening direction 32 and to close in a closing direction 34. The opening direction 32 and the closing direction 34 run horizontally and parallel to the guide rail 22 and the stator 26.

The door drive device 12 serves not only to open and close the cabin door leaf 16, but also to open and close a shaft door leaf 37, corresponding to the cabin door leaf 16, of a shaft door 39 having a first coupling element 36 and a second coupling element 38. The shaft door 39 is represented by the shaft door leaf 37 shown in dashed lines and the two coupling elements 36, 38. The two coupling elements 36 and 38 are designed as rollers and are arranged so that they can rotate freely about an axis of rotation oriented perpendicularly to the shaft door leaf 37. The shaft door 39 can be referred to as a first elevator door, and the shaft door leaf 37 as a first elevator door leaf. The cabin door 17 can be referred to as a second elevator door, and the cabin door leaf 16 as a second elevator door leaf.

The drive unit 24 has a second rotor 40 on which an elongated first driver 42 is arranged. The second rotor 40, like the first rotor 28, can be displaced along the stator 26 with a corresponding control and, together with the stator 26, forms a second linear motor 44. The drive unit 24 also has a third rotor 46 on which an elongated second driver 48 is arranged. The third rotor 46, like the first rotor 28 and the second rotor 40, can be displaced along the stator 26 and, together with the stator 26, forms a third linear motor 50. The three linear motors 30, 44, and 50 therefore have a common stator 26. The second rotor 40 and the third rotor 46, and thus the first driver 42 and the second driver 48, can be displaced independently of one another along the stator 26.

The first driver 42 and the second driver 48 are aligned parallel to a displacement direction 51 of the elevator cabin 10 and thus perpendicular to the horizontal opening direction 32 and closing direction 34. The elongated shape makes it possible to start opening the shaft door leaf 37 before the elevator cabin 10 has reached its final position at a floor.

In FIG. 1, the cabin door leaf 16 and the corresponding shaft door leaf 37 are completely closed. The two drivers 42 and 48 are positioned such that they can be guided between the two coupling elements 36 and 38 in the displacement direction 51 of the elevator cabin 10. This allows the elevator cabin 10 to be displaced past a floor, and thus past a shaft door with a shaft door leaf, without there being any contact between the door drive device 12 and the shaft door leaf. Starting from the position of the aforementioned components shown in FIG. 1, the cabin door leaf 16 and the corresponding shaft door leaf 37 can be opened.

The first driver 42 and the first coupling element 36 are arranged relative to one another in such a way that, as soon as the elevator cabin 10 is at or shortly before its final position at a floor, the first driver 42 can act upon the first coupling element 36 in such a way that the shaft door leaf 37 can be displaced in the opening direction 32 via the first driver 42. The first driver 42 then rests on the first coupling element 36 as shown in FIG. 2 and transmits a force, applied by the second linear motor 44, to the coupling element 36 in the opening direction 32. This positioning of the first driver 42 relative to the first coupling element 36 is shown in FIG. 2, in which the cabin door leaf 16 and the corresponding shaft door leaf 37 are partially opened.

In order to open the shaft door leaf starting from the position of the individual components shown in FIG. 1, the first driver 42 is displaced in the opening direction 32 by means of the second linear motor 44 until it rests on the first coupling element 36. In the event of a further displacement in the opening direction 32, the first driver 42 acts upon the first coupling element 36 and displaces the first coupling element 36 and thus the shaft door leaf 37 in the opening direction 32. This opens the shaft door leaf 37. At the same time, the cabin door leaf 16 is opened synchronously with the shaft door leaf 37 by means of the first linear motor 30.

Before the shaft door leaf 37 and the cabin door leaf 16 are opened, a first lock of the shaft door leaf (not shown in FIGS. 1 and 2) and a second lock of the cabin door leaf 16 (also not shown) are opened by means of an actuator.

In order to close the shaft door leaf 16 again, a force is exerted on the second driver 38 in the closing direction 34 via the second driver 48, which can be displaced by the third linear motor 50. The second driver 48 thus acts in the closing direction 34 upon the second driver 38 and thus upon the shaft door leaf 37 and displaces them back into the closed position shown in FIG. 1. At the same time, the cabin door leaf 16 is closed synchronously with the shaft door leaf 37 by means of the first linear motor 30. After the shaft door leaf 37 and the cabin door leaf 16 have been closed, the two drivers 42 and 48 are moved towards each other so that they also assume the position shown in FIG. 1, in which they can be guided between the two coupling elements 36 and 38. Finally, the first lock of the shaft door leaf 37 and the second lock of the cabin door leaf 16 are locked.

Figure 3:
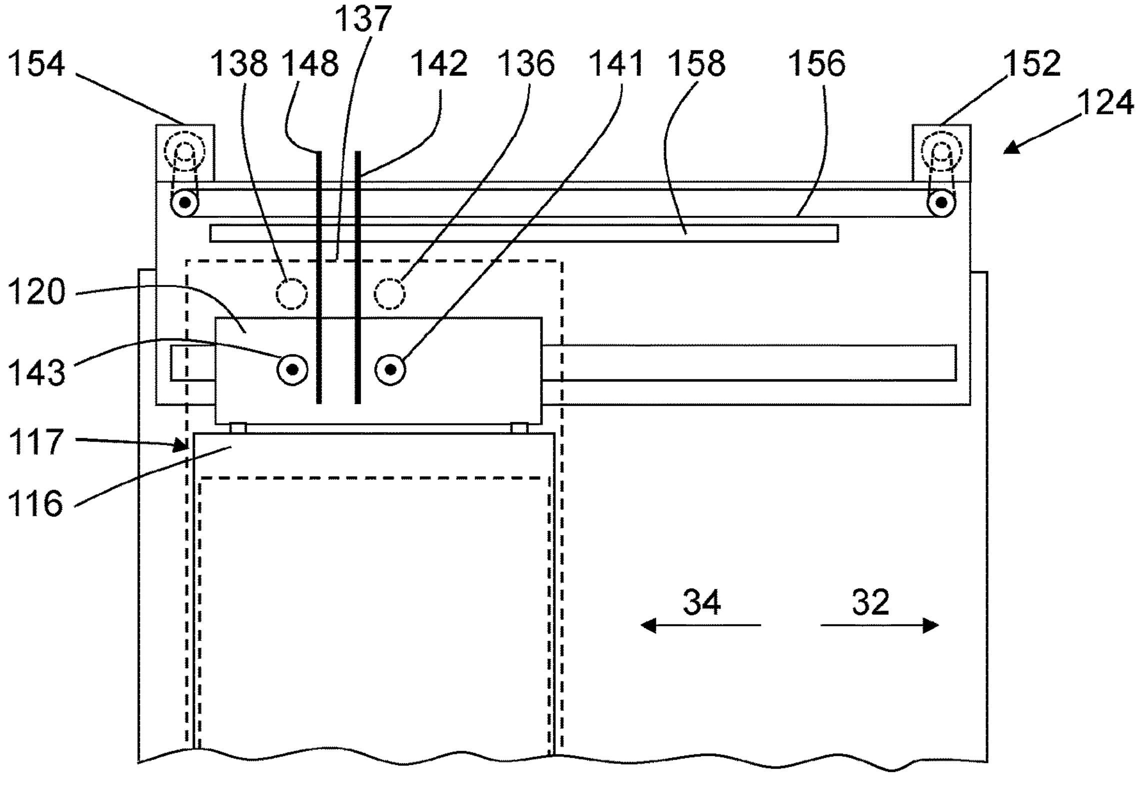
FIG. 3 shows a second exemplary embodiment of a cabin door of an elevator cabin of an elevator with a door drive device.

The door drive device 112 shown in FIG. 3 is constructed very similarly to the door drive device 12 in FIG. 1 and FIG. 2, which is why only the differences between the two door drive devices will be discussed.

In the door drive device 112 according to FIG. 3, the cabin door leaf 116 is not permanently coupled to a drive unit 124. Instead, a third coupling element 141 and a fourth coupling element 143 are arranged on a suspended carriage 120 and thus on a component, permanently connected to the cabin door leaf 116, of the cabin door 117. The third coupling element 141 is designed and arranged in the same way as the first coupling element 136 on the shaft door leaf 137, and the fourth coupling element 143 is designed and arranged in the same way as the second coupling element 138 on the shaft door leaf 137. A first driver 142 can thus act not only upon the first coupling element 136 on the shaft door leaf 137, but, simultaneously, also upon the third coupling element 141 on the cabin door leaf 116, and thus displace not only the shaft door leaf 137, but, simultaneously, also the cabin door leaf 116 in the opening direction 32. In the same way, a second driver 148 can thus act not only upon the second coupling element 138 on the shaft door leaf 137, but, simultaneously, also upon the fourth coupling element 143 on the cabin door leaf 116, and thus displace not only the shaft door leaf 137, but, simultaneously, also the cabin door leaf 116 in the closing direction 34.

The drive unit 124 does not have three linear motors like the drive unit 24 of FIGS. 1 and 2, but two electric motors 152, 154, each with a rotating output shaft. The first electric motor 152 is connected to the first driver 142 via a first, linearly acting, rotating drive means 156. The drive means 156 can be a toothed belt, a flat belt, a V-belt, or even a roller chain. This allows the first driver 142 to be displaced by the first electric motor 152 along a second guide 158 in the opening direction 32 and closing direction 34. The second electric motor 154 is connected to the second driver 148 via a second, linearly acting, rotating drive means which is located behind the first drive means 156 in FIG. 3 and is therefore not visible. This allows the second driver 148 to be displaced by the second electric motor 154 along the second guide 158 in the opening direction 32 and closing direction 34. The two drivers 142 and 148 can thus be displaced independently of each other in the opening direction 32 and in the closing direction 34.

Figure 4:
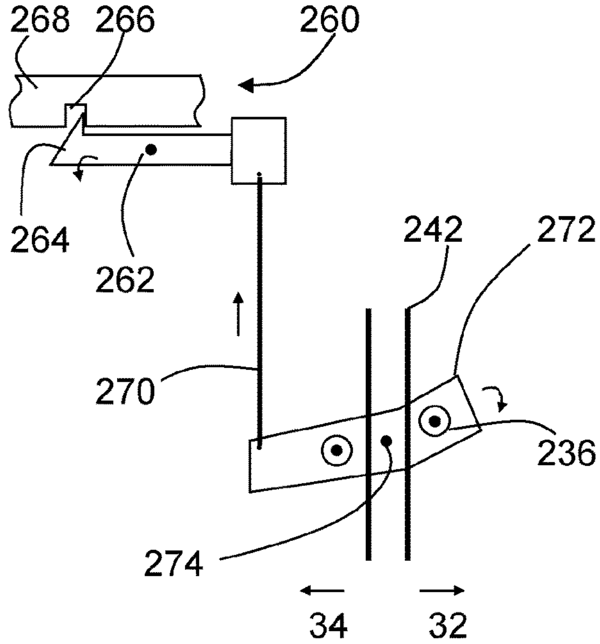
FIG. 4 shows a mechanically operated first lock for a shaft door leaf of a shaft door.

FIG. 4 shows a mechanically operated first lock for a shaft door leaf of a shaft door. The first lock 260 is arranged on a shaft door leaf (not shown in FIG. 4) and has a first latch 264 which can be pivoted about a first pivot axis 262 and which can engage in a first recess 266 in a frame 268 of the shaft door. In the position of the first latch 264 shown in FIG. 4, in which it engages in the first recess 266, the shaft door leaf cannot be displaced in the opening direction 32, whereby the shaft door leaf is locked.

The first latch 264 is connected to a lever 272 via a first, vertically aligned rod 270. The lever 272 is arranged to be pivotable about a second pivot axis 274 and has, at its end facing away from the first rod 270, a first coupling element 236 which is designed in the same way as the first coupling elements 36, 136 of FIGS. 1, 2, and 3. The first coupling element 236 is arranged above the second pivot axis 274, so that, when the first driver 242 is displaced in the opening direction 32, the lever 272 together with the first coupling element 236 is first tilted slightly downwards and only then displaced in the opening direction 32. The first coupling element 236 is thus initially displaced downwards in a first unlocking direction. This displacement leads to a displacement of the first rod 270 upwards and thus to a pivoting of the first latch 264 about the first pivot axis 262. The first latch 264 thus pivots out of the first recess 266, and the first lock 260 is unlocked. This allows the shaft door leaf to be displaced in the opening direction 32.

As soon as the first driver 242 no longer exerts any force on the first coupling element 236, the lever 272 seeks to rotate back into the position shown in FIG. 4 due to its weight distribution. This is possible when the shaft door leaf is closed again, and the first latch 264 can again engage in the first recess 266. The plunging is additionally supported by the weight distribution of the first latch 264.

Figure 5:
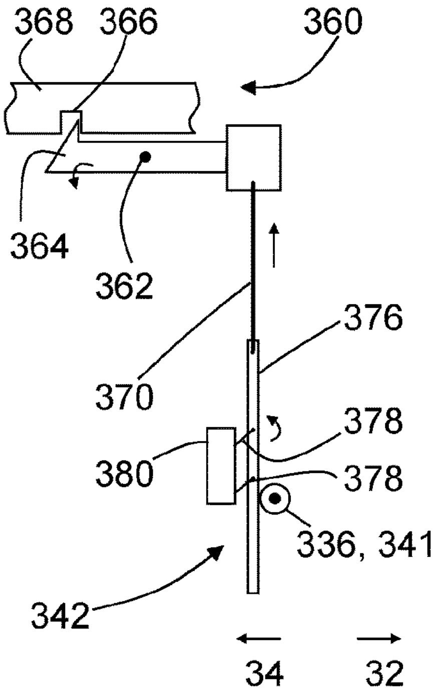
FIG. 5 shows a mechanically operated second lock for a cabin door leaf of a cabin door.

FIG. 5 shows a mechanically operated second lock for a cabin door leaf of a cabin door. The second lock 360 is arranged on a cabin door leaf (not shown in FIG. 5) and has a second latch 364 which can be pivoted about a third pivot axis 362 and which can engage in a second recess 366 in a frame 368 of the cabin door. In the position of the second latch 364 shown in FIG. 5, in which it engages in the first recess 366, the cabin door leaf cannot be displaced in the opening direction 32, whereby the cabin door leaf is locked.

In order to enable operation of the second lock 360, the first driver 342 is designed in two parts. An elongated contact element 376 is connected to a base element 380 via two pivot levers 378. Due to its own weight, the contact element 376 assumes a position at a maximum distance from the base element 380 without any force being applied. The base element 380 can be displaced in the opening direction 32 and closing direction 34 by the drive unit (not shown in FIG. 5). As soon as the contact element 376 rests against the first or third coupling element 336, 341 due to a corresponding displacement of the base element 380 in the opening direction 32, it is pivoted in the direction of the base element 380, guided by the aforementioned pivot levers 378. In the process, said contact element is displaced, among other things, vertically upwards and perpendicular to the opening direction 32, and thus in a second unlocking direction. This displacement in the second unlocking direction is transmitted to the second latch 364 via a second rod 370. This leads to a pivoting of the second latch 364 about the third pivot axis 362. The second latch 364 thus pivots out of the second recess 366, and the second lock 360 is unlocked. This allows the cabin door leaf to be displaced in the opening direction 32.

As soon as the contact element 376 is no longer pressed against the first or third coupling element 336, 341 via the base element 380, the contact element 376 seeks to return to the position shown in FIG. 5 due to its weight. This is possible when the cabin door leaf is closed again, and the second latch 364 can again engage in the second recess 366. The plunging is additionally supported by the weight distribution of the second latch 364.

Finally, it should be noted that terms such as "having," "comprising," etc., do not preclude other elements or steps, and terms such as "a" or "an" do not preclude a plurality. Furthermore, it should be noted that features or steps which have been described with reference to one of the above exemplary embodiments may also be used in the context of the claims in combination with other features or steps of other exemplary embodiments described above. Reference signs in the claims should not be considered to be limiting.

The invention claimed is:

1. A door drive device for opening and closing corresponding elevator door leaves of elevator doors of an elevator in the form of a cabin door leaf of a cabin door and a corresponding shaft door leaf of a shaft door, having a first driver which acts upon a first coupling element arranged on the first elevator door leaf to open a first elevator door leaf of a first elevator door and a second driver which acts upon a second coupling element arranged on the first elevator door leaf to close the first elevator door leaf of the first elevator door, wherein the first driver and the second driver can be displaced by a drive unit in an opening direction and a closing direction of the first elevator door, wherein:

the drive unit has a first drive for displacing the first driver and a second drive for displacing the second driver, and the first driver and the second driver can be displaced independently of one another in the opening direction and in the closing direction by the drive unit.

2. The door drive device according to claim 1, wherein:

the first coupling element arranged on the first elevator door leaf of the first elevator door can be displaced in a first unlocking direction deviating from the opening direction and the closing direction when displaced in the opening direction and is mechanically coupled to a first lock of the first elevator door such that the first lock is unlocked via said displacement of the first coupling element in the first unlocking direction.

3. The door drive device according to claim 1, wherein:

the first driver acts upon a third coupling element, arranged on a second elevator door, to open a second elevator door leaf, corresponding to the first elevator door leaf of the second elevator door, and the second driver acts upon a fourth coupling element, arranged on the second elevator door, to close the second elevator door leaf of the second elevator door.

4. The door drive device according to claim 3, wherein:

the first driver can be displaced via a contact with the first coupling element or the third coupling element in a second unlocking direction deviating from the opening direction and the closing direction and is mechanically coupled to a second lock of the second elevator door such that the second lock is unlocked via said displacement of the first driver in the second unlocking direction.

5. The door drive device according to claim 1, wherein:

a second elevator door leaf, corresponding to the first elevator door leaf, of a second elevator door is permanently coupled to the drive unit and can thus be displaced directly by the drive unit in the opening direction and in the closing direction.

6. The door drive device according to claim 5, wherein:

the drive unit has a third drive for displacing the second door leaf of the second elevator door.

7. The door drive device according to claim 1, wherein:

at least two of the drives of the drive unit are designed as linear motors which have a common stator and a respective rotor, wherein said rotors are displaceable independently of one another along the common stator.

8. The door drive device according to claim 1, wherein:

the first elevator door is designed as a shaft door, and a second elevator door is designed as a cabin door.

* * * * *